July 10, 1945.　　　　L. LOWY　　　　2,380,250
COMBINED PHONOGRAPH AND PROJECTOR
Filed May 8, 1944　　　　2 Sheets-Sheet 1

INVENTOR.
*Larry Lowy*
BY
ATTORNEY

July 10, 1945.   L. LOWY   2,380,250
COMBINED PHONOGRAPH AND PROJECTOR
Filed May 8, 1944   2 Sheets-Sheet 2
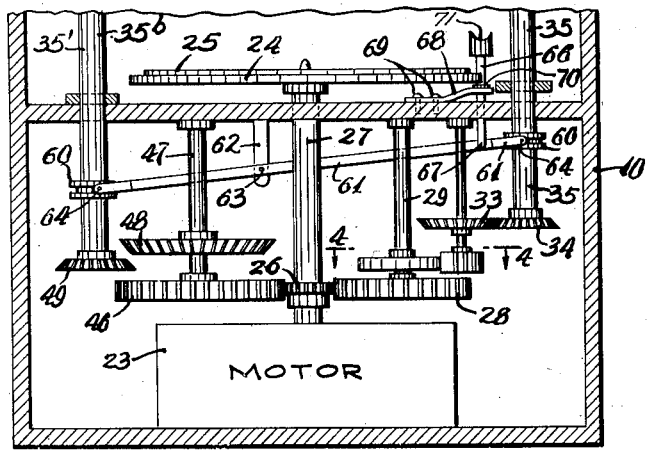
Fig. 3.
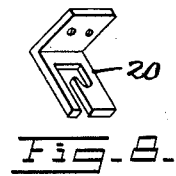
Fig. 8.
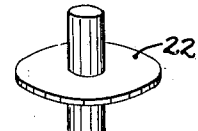
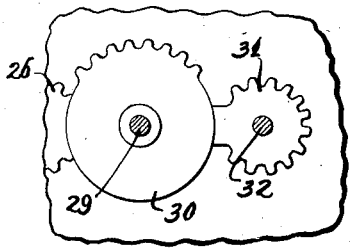
Fig. 4.
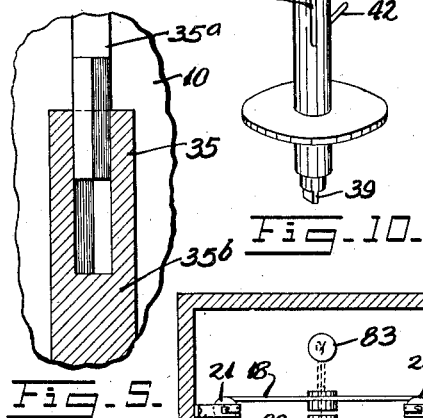
Fig. 10.
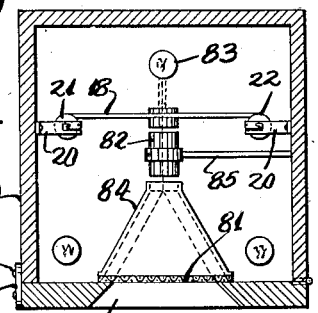
Fig. 12.
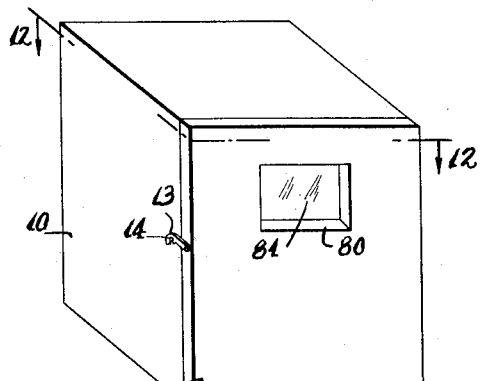
Fig. 11.
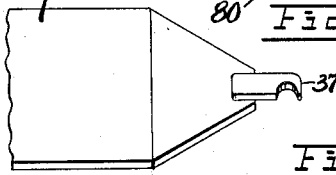
Fig. 9.
INVENTOR.
*Larry Lowy*
BY
*Zoltan Holeczek*
ATTORNEY Patented July 10, 1945

2,380,250

UNITED STATES PATENT OFFICE 2,380,250

COMBINED PHONOGRAPH AND PROJECTOR

Larry Lowy, New York, N. Y.

Application May 8, 1944, Serial No. 534,645

9 Claims. (Cl. 88—16.2)

This invention relates to new and useful improvements in a combined phonograph and motion picture toy. More specifically, the invention proposes the construction of a combined phonograph and motion picture toy characterized by a box within which a film is adapted to be moved to be viewed through an opening formed in one wall of the box with the provision of a lens for enlarging the characters on the film to be more easily viewed. While this is the preferred combination of the invention, the construction of the device may be modified to permit the pictures to be viewed without a lens, merely through openings formed in a wall of the box or it may be constructed to throw the characters on a screen contained within the box or externally of the box.

Still another object of the invention proposes the provision of clips for supporting a supply roller and a driven roller for film with a guide means for guiding the film between the rollers and covering portions thereof to permit the pictures to be successively viewed as they are moved between the rollers.

Still another object of the invention proposes the provision of a phonograph means mounted within the box for playing conventionally constructed records in conjunction with the film moving within the box to explain the action of the characters on the film.

Still another object of the invention proposes the provision of a means for intermittently driving the driven roller for the film and which is arranged in a manner to be actuated by the motor mechanism used for operating the phonograph means.

Still another object of the invention proposes the provision of a clutch arranged in connection with the driven roll and which is arranged in a manner to be opened when the film reaches its end.

Still another object of the invention proposes the provision of a means driven by the motor means of the phonograph in a manner to rewind the film when desired.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 3 is a vertical sectional view of the bottom portion of Fig. 2.

Fig. 4 is a horizontal sectional view taken on the line 4—4 of Fig. 3.

Fig. 5 is an enlarged vertical sectional view of a portion of Fig. 2.

Fig. 8 is a perspective view of one of the supporting clips for the film rolls.

Fig. 9 is a perspective view showing the hook on the end of the film.

Fig. 10 is a perspective view of the driven roller, per se.

Fig. 11 is a perspective view of a combined phonograph and motion picture toy similar to that of Fig. 1 but illustrating a modification of the invention.

Fig. 12 is a horizontal sectional view taken on the line 12—12 of Fig. 11.

Figure 1:
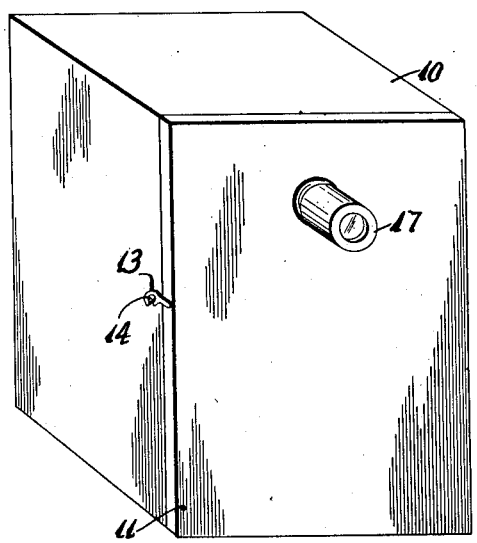
Fig. 1 is a perspective view of a combined phonograph and motion picture toy constructed in accordance with this invention.
Figure 6:
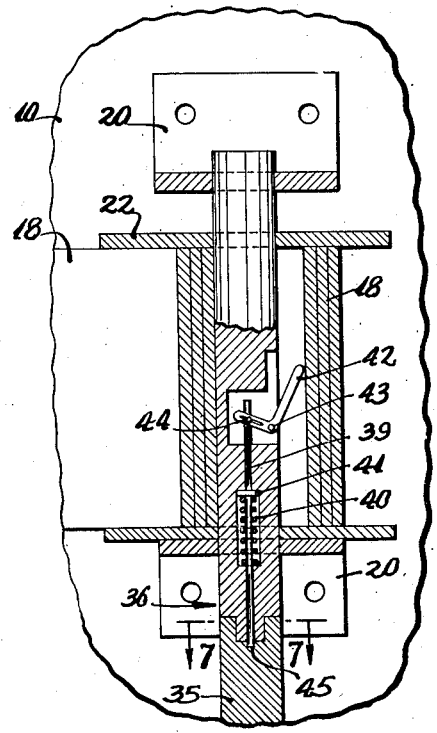
Fig. 6 is a vertical sectional view through the driven roll for the film.
Figure 2:
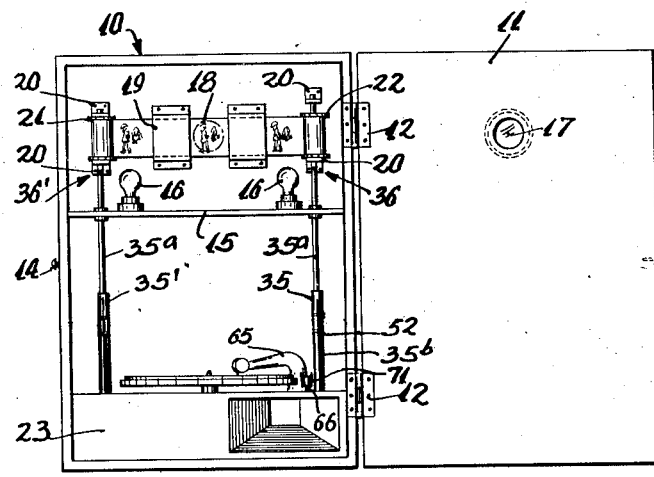
Fig. 2 is a front elevational view of Fig. 1 with the cover in an open position.
Figure 7:
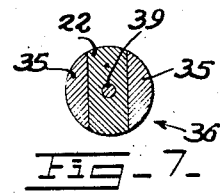
Fig. 7 is a horizontal sectional view taken on the line 7—7 of Fig. 6.

This combined phonograph and motion picture toy, according to this invention, includes a box 10 having an open front adapted to be closed by means of a cover 11. The cover 11 is pivotally supported upon hinges 12 and is adapted to be retained in a closed position by the provision of a catch 13 on the cover 11 engageable with a keeper element 14 on the body of the box 10. The interior of the box 10 is divided into superimposed chambers by means of a horizontal wall 15 and electric lights 16 are provided for illuminating the interior of the top chamber.

A lens 17 is mounted through the front wall 11 of the box 10 and is adapted to be used for viewing a film 18 which is moving across the opposite wall of the top chamber of the box 10. A guide means is provided for guiding the film 18 at an elevation to be viewed when looking through the lens 17. This means comprises spaced metallic brackets 19 mounted upon the wall of the box 10 and through which the film 18 passes. The adjacent edges of the brackets 19 are spaced from each other a distance equal to one frame of the film 18 permitting one frame to be viewed at a time. The remaining portions of the brackets 19 act to cover the approaching frame of the film and the passing frame of the film to permit only the exposed frame to be viewed through the lens 17.

Clips 20 are mounted upon the wall of the box 10 on opposite sides of the brackets 19 for supporting a slide roller 21 and a driven roller 22 for the film 18. The rollers 21 and 22 are turnably supported in the brackets 20 and the roller 22, when driven, will draw the film 18 from the supply roller 21. A phonograph means 23 is mounted within the bottom compartment of the box 10 and is provided with a motor driven turntable 24 upon which records 25 are adapted to be rested. The records 25 are to be played in conjunction with the film 18 for the purpose of explaining the action of the characters on the film 18.

Means is provided for intermittently turning the driven roller 22 and actuated by the motor driven turntable mechanism 24 for advancing the film 18 one frame at a time. This means comprises a gear 26 mounted on the driven shaft 27 of the turntable mechanism 24 and meshes with a second gear 28. The gear 28 is fixedly supported to a shaft 29 rotatively supported upon a portion of the box 10. The shaft 29 carries one gear 30 of an intermittent drive which in turn meshes with the second gear 31 of the intermittent drive. The gear 31 is mounted upon a shaft 32 which carries a bevel gear 33. The bevel gear 33 meshes with a second bevel gear 34 mounted upon a vertical rotatively supported shaft 35. The shaft 35 extends upwards through the box 10 and is connected with the bottom end of the driven roller 22. The gear 26 will be continuously rotated by the motor driven turntable mechanism, but the shaft 35 will only be intermittently turned due to the positioning of the intermittent drive gears 30 and 31 in the transmission between the shaft 27 and the shaft 35.

A clutch 36 is arranged between the adjacent ends of the vertical shaft 35 and the driven roller 22. This clutch 36 is designed to cause the driven roller 22 to be driven by the shaft 35 when the bevel gears 33 and 34 are engaged. Means is provided for opening the clutch 36 when the end of the film is reached. The ends of the film 18 are connected with their respective rollers by means of hooks 37 which engage complementary slits 38 formed in their respective rollers. This prevents a complete disengagement of the end of the film from its respective roller when the film is completely rolled in one direction or the other, unless it is manually unhooked. A rod 39 is slidably extended through the bottom portion of the driven roller 22 and is urged into an inoperative position by an expansion spring 40. The expansion spring 40 operates between the base wall of a recess formed in the roller 22 and a collar 41 mounted on the shaft 39. A bell crank lever 42 is pivotally supported intermediate of its ends upon the roller 22 by means of a pin 43. The inner arm of the bell crank lever 42 is pivotally attached to the top end of the rod 39 by means of a pin 44. The opposite end of the bell crank lever 42 projects from the roller 22 and is adapted to have the film 18 wound thereover. The bottom end of the shaft 39 engages into a small opening 45 formed in the top end of the vertical shaft 35.

Normally, the turns of the film 18 are wound upon the driven roller 22 and do not affect the operation of the bell crank lever 42. However, when the end of the film is reached its hook engagement with the slide roller will cause the turns of the film 18 on the driven roller 22 to be pulled tightly thereon and urge the bell crank lever 42 inwards. This will press downwards upon the shaft 39 against the operation of the spring 40 to project the end of the shaft 39 from the bottom driven roller 22 and urge the roller 22 upwards relative to the shaft 35. This will open the clutch 36 and permit the shaft 35 to rotate independently of the driven roller 22 until such time as the motor driven turntable mechanism stopped to discontinue rotations of the shaft 35.

A rewind mechanism is also provided and is driven by the motor of the motor driven turntable mechanism 25. This means comprises a gear 46 also arranged to mesh with the gear 26 and fixed to a rotatively supported stud shaft 47. A bevel gear 48 is mounted on the stud shaft 47 and is adapted to mesh with a second bevel gear 49 mounted upon a vertical shaft 35'. The vertical shaft 35' extends vertically upwards through the box 10 and is connected by a clutch mechanism 36', with the bottom end of the slide roller 21.

The shafts 35 and 35' are each formed of separate sections 35ª and 35ᵇ which slidably engage each other but which are non-rotatively engaged, causing one section to be rotated when the other rotates.

Means is provided between the shafts 35 and 35' for controlling the engagement and disengagement of the gears 33 and 34 and the gears 48 and 49. This means is characterized by a curved collar 60 which is mounted upon the bottom section of each of the shafts 35 and 35'. An arm 61 is fulcrumed intermediate of its ends upon a bracket 62. The arm 61 is attached to the bracket 62 by means of a pin 63. The ends of the arm 61 are forked and provided with inwardly extending trunnions 64 which engage the grooved collars 60. Thus as the arm 61 is pivoted it will cause the bottom section of one of the shafts to move downwards while the other moves upwards, and vice versa.

Means controlled by the tone arm 65 of the phonograph means is provided for pivoting the arm 61. This means comprises a vertically slidably mounted shaft 66 which is pivotally connected at one end with the arm 61 by means of a pin 67. A leaf spring 68 has one of its ends securely attached by means of several pins 69 to a portion of the casing 10. The opposite end of the leaf spring 68 is engaged freely beneath a collar 70 formed on the shaft 66 for urging the shaft 66 into a raised position in which the gears 33 and 34 will be engaged to rotate the shaft 35 and advance the film 18.

The top end of the shaft 66 is provided with a rest member 71 upon which the tone arm 65 is adapted to be rested when not being used to urge the shaft 66 downwards against the action of the leaf spring 68. This will pivot the arm 61 and disengage the gears 33 and 34, while simultaneously raising the bottom end of the shaft 35' to engage the gears 48 and 49 to cause the shaft 35' to be rotated to rewind the film 18 upon its original roller.

Again lifting the tone arm off the rest 71 will free the shaft 66 to permit the leaf spring 68 to urge it vertically upwards and pivot the arm 61 back to its original position.

The operation of this invention is as follows:

A film 18 is engaged in position between the rollers 21 and 22. The complementary rod is mounted on the turntable 24 and the turntable 24 is set in operation. The cover 11 is then closed and the person viewing the film looks into the box 10 through the lens 17. The turntable mechanism 24 will be in rotation, playing the record 25 to describe the action of the characters on the film. Simultaneously, the motor mechanism of the phonograph means 23 will intermittently drive the shaft 35 and advance the film 18 one frame at a time. This will continue until the film is completely wound upon the driven roller 22 when the tension of the film will cause the shaft 39 to be extended and open the clutch 36, preventing further advance of the film. The picture is then complete and the person may then rewind the film on the supply roller 21 by separating the gears 33 and 34 and engaging the gears 48 and 49 to rewind the film 18 on the supply roller 21. Thus the motor mechanism of the phonograph means 23 may be used for advancing the film 18 within the box 10 and for rewinding the film 18 upon the slide roller 21.

In Figs. 11 and 12 a modified form of the combined phonograph and motion picture toy has been illustrated in which the front cover 11 of the container 10 is provided with an opening 80 having a cloth screen 81 mounted across the back face thereof. The film 18 passing between the supply roll 21 and the roller 22 passes through a lens system 82 designed to enlarge and throw the characters of the film 18 onto the screen 81. A light 83 is mounted behind the lens system 82 to supply the required light to illuminate the characters of the film 18 and carry them to the screen 81. A funnel-like tunnel 84 is mounted between the front end of the lens system 82 and the screen 81 for confining the light passing through the lens system 82 to fall on the screen 81. A portion of the lens 82 is adjustably mounted upon a suitable bracket 85 projecting from one of the inside faces of one side wall of the container 10.

In other respects this form of the invention is similar to that previously shown and like reference numerals identify like parts in each of the several views.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new, and desire to secure by United States Letters Patent is:

1. A combined phonograph and motion picture toy, comprising a box, lamps for lighting up the interior of said box, a lens mounted through one wall of said box, guide means for film mounted on the opposite wall of said box, clips for supporting a supply roll and a driven roll for film, phonograph means within said box and having a motor driven turntable, means for intermittently turning said driven roll and actuated by said motor driven turntable mechanism and including a clutch a supply roll of film mounted on said clips and having its film web engaging said guide means and connected with said driven roll, and means for opening said clutch when the end of said film is reached, said first means comprising a vertical shaft having its bottom end attached to said driven motor and a transmission between said phonograph means and said shaft and including intermittent gears, said clutch being arranged between the adjacent ends of said driven roller and said vertical shaft, said latter mentioned means comprising a rod slidably supported in said driven roller and having an extended bottom end engaging an opening in the top end of said vertical shaft, and means controlled by the tension of the film wound upon said driven roller for extending said rod to lift said driven roller and separate said clutch.

2. A combined phonograph and motion picture toy, comprising a box, lamps for lighting up the interior of said box, a lens mounted through one wall of said box, guide means for film mounted on the opposite wall of said box, clips for supporting a supply roll and a driven roll for film, phonograph means within said box and having a motor driven turntable, means for intermittently turning said driven roll and actuated by said motor driven turntable mechanism and including a clutch, a supply roll of film mounted on said clips and having its film web engaging said guide means and connected with said driven roll, and means for opening said clutch when the end of said film is reached, and means for rewinding said film upon said supply roller, said means for intermittently turning said driven roller and said means for rewinding said film being controlled by the tone arm of said phonograph means permitting one or the other to be used.

3. A combined phonograph and motion picture toy, comprising a box, lamps for lighting up the interior of said box, a lens mounted through one wall of said box, guide means for film mounted on the opposite wall of said box, clips for supporting a supply roll and a driven roll for film phonograph means within said box and having a motor driven turntable, means for intermittently turning said driven roll and actuated by said motor driven turntable mechanism and including a clutch a supply roll of film mounted on said clips and having its film web engaging said guide means and connected with said driven roll, and means for opening said clutch when the end of said film is reached, said first means comprising a vertical shaft having its bottom end attached to said driven motor and a transmission between said phonograph means and said shaft and including intermittent gears, said clutch being arranged between the adjacent ends of said driven roller and said vertical shaft, said latter mentioned means comprising a rod shaft slidably supported in said driven roller and having an extended bottom end engaging an opening in the top end of said vertical shaft, and means controlled by the tension of the film wound upon said driven roller for extending said rod shaft to lift said driven roller and separate said clutch, said rod having its top end exposed in an opening extended inwards from one side of said driven roller, said controlling means for said rod, comprising a bell crank lever pivotally supported in said opening and having one arm pivotally attached to said rod and its other arm extended from said opening to be pivoted inwards as said film is pulled tight on said roller by continued turning of said roller when the end of the film is reached to lift said driven roller by extending said rod from the bottom of said roller to disengage said clutch and stop said roller from turning.

4. A combined phonograph and motion picture toy, comprising a box, lamps for lighting up the interior of said box, a lens mounted through one wall of said box, guide means for film mounted on the opposite wall of said box, clips for supporting a supply roll and a driven roll for film, phonograph means within said box and having a motor driven turntable, means for intermittently turning said driven roll and actuated by said motor driven turntable mechanism and including a clutch a supply roll of film mounted on said clips and having its film web engaging said guide means and connected with said driven roll, and means for opening said clutch when the end of said film is reached, said first means comprising a vertical shaft having its bottom end attached to said driven motor and a transmission between said phonograph means and said shaft and including intermittent gears, said clutch being arranged between the adjacent ends of said driven roller and said vertical shaft, said latter mentioned means comprising a rod shaft slidably supported in said driven roller and having an extended bottom end engaging an opening in the top end of said vertical shaft, and means controlled by the tension of the film wound upon said driven roller for extending said rod shaft to lift said driven roller and separate said clutch, said rod having its top end exposed in an opening extended inwards from one side of said driven roller, said controlling means for said rod, comprising a bell crank lever pivotally supported in said opening and having one arm pivotally attached to said rod and its other arm extended from said opening to be pivoted inwards as said film is pulled tight on said roller by continued turning of said roller when the end of the film is reached to lift said driven roller by extending said rod from the bottom of said roller to disengage said clutch and stop said roller from turning, and resilient means for urging said rod into an inoperative position permitting the engagement of said clutch when said film is not under tension on said roller.

5. A combined phonograph and motion picture toy, comprising a box, lamps for lighting up the interior of said box, a lens mounted through one wall of said box, guide means for film mounted on the opposite wall of said box, clips for supporting a supply roll and a driven roll for film, phonograph means within said box and having a motor driven turntable, means for intermittently turning said driven roll and actuated by said motor driven turntable mechanism and including a clutch a supply roll of film mounted on said clips and having its film web engaging said guide means and connected with said driven roll, and means for opening said clutch when the end of said film is reached, said first means comprising a vertical shaft having its bottom end attached to said driven motor and a transmission between said phonograph means and said shaft and including intermittent gears, said clutch being arranged between the adjacent ends of said driven roller and said vertical shaft, said latter mentioned means comprising a rod shaft slidably supported in said driven roller and having an extended bottom end engaging an opening in the top end of said vertical shaft, and means controlled by the tension of the film wound upon said driven roller for extending said rod shaft to lift said driven roller and separate said clutch, said rod having its top end exposed in an opening extended inwards from one side of said driven roller, said controlling means for said rod, comprising a bell crank lever pivotally supported in said opening and having one arm pivotally attached to said rod and its other arm extended from said opening to be pivoted inwards as said film is pulled tight on said roller by continued turning of said roller when the end of the film is reached to lift said driven roller by extending said rod from the bottom of said roller to disengage said clutch and stop said roller from turning, and resilient means for urging said rod into an inoperative position permitting the engagement of said clutch when said film is not under tension on said roller, said resilient means, comprising a collar mounted on an intermediate portion of said rod within an enlarged recess formed in said roller, and an expansion spring on said rod and operating between said collar and the base wall of said recess urging said rod into an inoperative raised position.

6. A combined phonograph and motion picture toy, comprising a box, lamps for lighting up the interior of said box, a lens mounted through one wall of said box, guide means for film mounted on the opposite wall of said box, clips for supporting a supply roll and a driven roll for film phonograph means within said box and having a motor driven turntable, means for intermittently turning said driven roll and actuated by said motor driven turntable mechanism and including a clutch, a supply roll of film mounted on said clips and having its film web engaging said guide means and connected with said driven roll, and means for opening said clutch when the end of said film is reached, and means for rewinding said film upon said supply roller, said means for intermittently turning said driven roller and said means for rewinding said film being controlled by the tone arm of said phonograph means permitting one or the other to be used, said supply roll and driven roll being supported and connected with telescopic shafts of vertically slidably but non-rotatively engaged sections, each of said shafts having its bottom section vertically slidably supported and provided at its bottom end with a bevel gear, said means for intermittently turning said driven roll, comprising a gear train from said driven motor terminating in a bevel gear engageable with the bevel gear on the bottom end of the shaft of said driven roll, a gear train from said motor drive terminating in a bevel gear engageable with the bevel gear on the bottom end of the shaft of said supply roll, and means for raising the bottom section of the shaft of said driven roll to engage its bevel gear with the bevel gear of its gear train while simultaneously lowering the bottom end of the shaft of said supply roll to disengage its bevel gear from the bevel gear of its gear train and vice versa.

7. A combined phonograph and motion picture toy, comprising a box, lamps for lighting up the interior of said box, a lens mounted through one wall of said box, guide means for film mounted on the opposite wall of said box, clips for supporting a supply roll and a driven roll for film phonograph means within said box and having a motor driven turntable, means for intermittently turning said driven roll and actuated by said motor driven turntable mechanism and including a clutch, a supply roll of film mounted on said clips and having its film web engaging said guide means and connected with said driven roll, and means for opening said clutch when the end of said film is reached, and means for rewinding said film upon said supply roller, said means for intermittently turning said driven roller and said means for rewinding said film being controlled by the tone arm of said phonograph means permitting one or the other to be used, said supply roll and driven roll being supported and connected with telescopic shafts of vertically slidably but non-rotatively engaged section, each of said shafts having its bottom section vertically slidably supported and provided at its bottom end with a bevel gear, said means for intermittently turning said driven roll, comprising a gear train from said driven motor terminating in a bevel gear engageable with the bevel gear on the bottom end of the shaft of said driven roll, a gear train from said motor drive terminating in a bevel gear engageable with the bevel gear on the bottom end of the shaft of said supply roll, and means for raising the bottom section of the shaft of said driven roll to engage its bevel gear with the bevel gear of its gear train while simultaneously lowering the bottom end of the shaft of said supply roll to disengage its bevel gear from the bevel gear of its gear train and vice versa, said latter means, comprising a lever pivotally supported intermediate of its ends and having its ends rotatively but non-slidably connected with the bottom sections of said shafts, a vertical slidably mounted shaft having its bottom end pivotally attached to said lever between its pivot point and its end attached to the shaft of said driven roll, means urging said shaft into a raised position to pivot said lever to cause said driven roll to be rotated while simultaneously holding the bevel gear of said supply roll disengaged from its gear train, and means for urging said shaft into a lowered position against the action of said previous means to pivot said lever and cause said supply roll to be rotated while simultaneously holding the bevel gear of said driven roll disengaged from its gear train.

8. A combined phonograph and motion picture toy, comprising a box, lamps for lighting up the interior of said box a lens mounted through one wall of said box, guide means for film mounted on the opposite wall of said box, clips for supporting a supply roll and a driven roll for film phonograph means within said box and having a motor driven turntable, means for intermittently turning said driven roll and actuated by said motor driven turntable mechanism and including a clutch, a supply roll of film mounted on said clips and having its film web engaging said guide means and connected with said driven roll, and means for opening said clutch when the end of said film is reached, and means for rewinding said film upon said supply roller, said means for intermittently turning said driven roller and said means for rewinding said film being controlled by the tone arm of said phonograph means permitting one or the other to be used, said supply roll and driven roll being supported and connected with telescopic shafts of vertically slidably but non-rotatively engaged section, each of said shafts having its bottom section vertically slidably supported and provided at its bottom end with a bevel gear, said means for intermittently turning said driven roll, comprising a gear train from said driven motor terminating in a bevel gear engageable with the bevel gear on the bottom end the shaft of said driven roll, a gear train from said motor drive terminating in a bevel gear engageable with the bevel gear on the bottom end of the shaft of said supply roll, and means for raising the bottom section of the shaft of said driven roll to engage its bevel gear with the bevel gear of its gear train while simultaneously lowering the bottom end of the shaft of said supply roll to disengage its bevel gear from the bevel gear of its gear train and vice versa, said latter means, comprising a lever pivotally supported intermediate of its ends and having its ends rotatively but non-slidably connected with the bottom sections of said shafts, a vertical slidably mounted shaft having its bottom end pivotally attached to said lever between its pivot point and its end attached to the shaft of said driven roll, means urging said shaft into a raised position to pivot said lever to cause said driven roll to be rotated while simultaneously holding the bevel gear of said supply roll disengaged from its gear train, and means for urging said shaft into a lowered position against the action of said previous means to pivot said lever and cause said supply roll to be rotated while simultaneously holding the bevel gear of said driven roll disengaged from its gear train, said next to the last means, comprising a collar on said vertical slidably mounted shaft, and a leaf spring having one end fixedly mounted and its other end engaged beneath said collar urging said shaft upwards.

9. A combined phonograph and motion picture toy, comprising a box, lamps for lighting up the interior of said box, a lens mounted through one wall of said box, guide means for film mounted on the opposite wall of said box, clips for supporting a supply roll and a driven roll for film phonograph means within said box and having a motor driven turntable, means for intermittently turning said driven roll and actuated by said motor driven turntable mechanism and including a clutch, a supply roll of film mounted on said clips and having its film web engaging said guide means and connected with said driven roll, and means for opening said clutch when the end of said film is reached, and means for rewinding said film upon said supply roller, said means for intermittently turning said driven roller and said means for rewinding said film being controlled by the tone arm of said phonograph means permitting one or the other to be used, said supply roll and driven roll being supported and connected with telescopic shafts of vertically slidably but non-rotatively engaged section, each of said shafts having its bottom section vertically slidably supported and provided at its bottom end with a bevel gear, said means for intermittently turning said driven roll, comprising a gear train from said driven motor terminating in a bevel gear engageable with the bevel gear on the bottom end of the shaft of said driven roll, a gear train from said motor drive terminating in a bevel gear engageable with the bevel gear on the bottom end of the shaft of said supply roll, and means for raising the bottom section of the shaft of said driven roll to engage its bevel gear with the bevel gear of its gear train while simultaneously lowering the bottom end of the shaft of said supply roll to disengage its bevel gear from the bevel gear of its gear train and vice versa, said latter means, comprising a lever pivotally supported intermediate of its ends and having its ends rotatively but non-slidably connected with the bottom sections of said shafts, a vertical slidably mounted shaft having its bottom end pivotally attached to said lever between its pivot point and its end attached to the shaft of said driven roll, means urging said shaft into a raised position to pivot said lever to cause said driven roll to be rotated while simultaneously holding the bevel gear of said supply roll disengaged from its gear train, and means for urging said shaft into a lowered position against the action of said previous means to pivot said lever and cause said supply roll to be rotated while simultaneously holding the bevel gear of said driven roll disengaged from its gear train, and a rest mounted on the top of said vertically slidably mounted shaft and upon which said tone arm is adapted to be rested when not in use so that the weight of the tone arm urges the shaft downwards and comprising the latter means for so urging the shaft.

LARRY LOWY.